United States Patent
Sultan

Patent Number: 5,706,652
Date of Patent: Jan. 13, 1998

[54] CATALYTIC CONVERTER MONITOR METHOD AND APPARATUS

[75] Inventor: Michel Farid Sultan, Troy, Mich.

[73] Assignee: General Motors Corporation, Detroit, Mich.

[21] Appl. No.: 636,091

[22] Filed: Apr. 22, 1996

[51] Int. Cl.$^6$ .................................................. F01N 3/20
[52] U.S. Cl. ............................. 60/274; 60/276; 60/277
[58] Field of Search ....................... 60/274, 276, 277; 123/674

[56] References Cited

U.S. PATENT DOCUMENTS

| | | | |
|---|---|---|---|
| 4,319,451 | 3/1982 | Tajima et al. | 60/277 |
| 5,133,184 | 7/1992 | Geiger | 60/277 |
| 5,182,907 | 2/1993 | Kuroda et al. | 60/277 |
| 5,303,580 | 4/1994 | Schneider et al. | 123/672 |

FOREIGN PATENT DOCUMENTS

| | | | |
|---|---|---|---|
| 2643739 | 3/1978 | Germany | 60/277 |

OTHER PUBLICATIONS

Catalytic Converter Diagnosis Using the Catalyst Exotherm; Joseph R. Theis, AC Delco Systems Division of GMC; SAE #942058; Fuels & Lubricants Meeting & Exposition; Baltimore, MD; Oct. 17–20, 1994.

Calculating the Rate of Exothermic Energy Release for Catalytic Converter Efficiency Monitoring; Joseph S. Hepburn & Allen H. Meitzler; Ford Motor Company; SAE #952423; Fuels & Lubricants Meeting & Exposition; Toronto, Ontario; Oct. 16–19, 1995.

Alternative Technologies for Studying Catalyst Behaviour to Meet OBD II Requirements; Stephen Pelters, Dietmar Schwarzenthal (Porche AG); Wolfgang Maus, Helmut Swars & Rolf Bruck (EMITEC GmbY); SAE #932854; Fuels & Lubricants Meeting & Exposition; Philadelphia, PA; Oct. 18–21, 1993.

Alternatives for Catalyst Condition Monitoring on Gasoline Emission Control Systems; D. Williams (Lucas Auto. Ltd.); B. Bradshaw (Lucas Auto. Ltd.); No. C–422/017; pp. 1–3, Figures 1–6.

A Catalytic Oxidation Sensor for the On Board Detection of Misfire & Catalyst Efficiency; Wei Cai & Nick Collings; University of Cambridge; #922248; pp. 51–62.

A Linear Catalyst Temperature Sensor for Exhaust Gas Ignition (EGI) & On Board Diagnostics of Misfire & Catalyst Efficiency; Nick Collings & Wei Cai (University of Cambridge); Tom Ma (Ford Motor Co.); David Ball (Kidde–Graviner Ltd.); #930938; pp. 167–172.

*Primary Examiner*—Sheldon Richter
*Attorney, Agent, or Firm*—Anthony Luke Simon

[57] ABSTRACT

A catalytic converter monitor apparatus comprising: a first temperature sensor mounted in a vehicle exhaust system upstream of a catalytic converter catalyst; a second temperature sensor mounted in the vehicle exhaust system downstream of at least a portion of the catalytic converter catalyst; an exotherm monitor coupled to the first and second temperature sensors, providing an output signal indicative of a quantity of exothermic reaction taking place in the catalytic converter; a table generator coupled to the exotherm monitor, receiving the output signal from the exotherm monitor and generating a table of exotherm criteria responsive to the output signal; and an exotherm analyzer coupled to the exotherm monitor and the table generator, providing an output responsive to a comparison between a present value of the output signal and a corresponding criteria stored in the table.

9 Claims, 3 Drawing Sheets

5,706,652

CATALYTIC CONVERTER MONITOR METHOD AND APPARATUS

This invention relates to a catalytic converter monitor method and apparatus.

BACKGROUND OF THE INVENTION

One goal of automotive vehicle designers is an onboard diagnostic system that can measure the effectiveness of vehicle emissions control devices such as catalytic converters. In general, a catalytic converter contains a catalyst in the exhaust path that causes certain target species of the exhaust gases to convert to different gaseous species that are thought acceptable for tail pipe emissions. For example, the catalytic converter removes HC, CO and NOx from the exhaust gas.

Over time or during certain engine conditions, catalysts may age and lose efficiency. When the catalytic converter catalyst loses efficiency, it may fail to convert sufficient amounts of the undesirable species of exhaust gases, reducing the vehicle's ability to meet tail pipe emissions standards or goals.

SUMMARY OF THE PRESENT INVENTION

It is an object of this invention to provide a catalytic converter monitor according to Claim 1.

Advantageously, this invention provides a catalytic converter monitor method and apparatus that monitors the exothermic reaction in the catalytic converter caused by the removal of $H_2$, HC, CO and NOx from engine exhaust gases. The exothermic reaction releases heat through the converter structure and transfers heat to the exhaust gas being treated by the catalytic converter. The amount of heat released is monitored according to this invention and a diagnostic for the catalytic converter first self-calibrates and then executes to determine catalytic converter efficiency.

Advantageously, this invention provides a catalytic converter monitor method and apparatus that provides for self calibration when a vehicle is new or when a new catalytic converter is placed in the vehicle by monitoring the performance of the new catalytic converter and generating calibration tables responsive to the performance of the new catalytic converter. Advantageously then, this invention eliminates the need for predetermining catalytic converter efficiency tables and for programming them into the vehicle.

Advantageously, this invention eliminates the need for highly accurate sensors for measuring the catalyst exotherm. More particularly, many temperature sensors are available for use in applications such as in the exhaust stream from an internal combustion engine, but such sensors typically have a large error range, for example, plus or minus 10 degrees. Temperature sensors with higher accuracy are available, but are costly. The inexpensive sensors, while having a large error range, are typically repeatable with precision. In other words, if a sensor tends to provide measurement readings that are 10 degrees below the actual temperature measurement, that sensor will be consistent in this type of performance and will repeatedly provide temperature readings with the same error, i.e., 10 degrees below the actual temperature measurement, +/−1 degree. While such a large error may make use of preprogrammed tables impractical, this invention provides a means of first generating the exotherm tables using the sensor information when the vehicle is running and the catalytic converter catalyst is new. Thus the generated tables automatically take into account the sensor errors and the sensing algorithm using the generated tables are thereafter immune to the sensor errors.

Advantageously then, according to a preferred example of this invention, a catalytic converter monitor apparatus is provided comprising: a first temperature sensor mounted in a vehicle exhaust system upstream of a catalytic converter catalyst; a second temperature sensor mounted in the vehicle exhaust system downstream of at least a portion of the catalytic converter catalyst; an exotherm monitor coupled to the first and second temperature sensors, providing an output signal indicative of a quantity of exothermic reaction taking place in the catalytic converter; a table generator coupled to the exotherm monitor, receiving the output signal from the exotherm monitor and generating a table of exotherm criteria responsive to the output signal; and an exotherm analyzer coupled to the exotherm monitor and the table generator, providing an output responsive to a comparison between a present value of the output signal and a corresponding criterion stored in the table.

Advantageously, according to another preferred example of this invention, a catalytic converter monitor method is provided comprising the steps of: periodically measuring exothermic reaction of a catalytic converter receiving exhaust gas from an internal combustion engine; during a time period in which the catalytic converter is new, generating an exotherm base line table responsive to the measured exothermic reaction; after the time period in which the catalytic converter is new, comparing the measured exothermic reaction to the exotherm base line table; and indicating an operating condition of the catalytic converter responsive to the comparison.

BRIEF DESCRIPTION OF THE DRAWINGS

The present invention will now be described by way of example with reference to the following drawings in which.

DETAILED DESCRIPTION OF THE INVENTION

Figure 1:
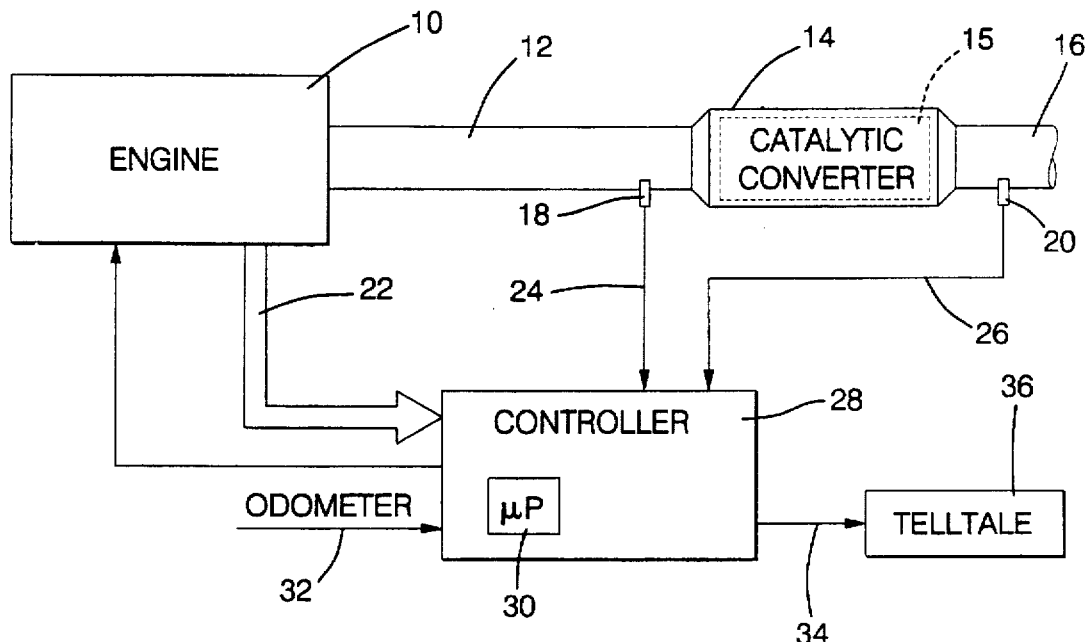
FIG. 1 illustrates a schematic of an example catalytic converter monitor apparatus according to this invention.

Referring now to FIG. 1, the system shown illustrates a catalytic converter 14 receiving exhaust gas from internal combustion engine 10. The exhaust gas flows past the catalytic converter catalyst 15 of a type known to those skilled in the art where gaseous species of $H_2$, HC, CO and NOx are converted to more desirable gas species (i.e., $CO_2$, $H_2O$ and $N_2$). The gas then flows through pipe 16 to the vehicle muffler (not shown) and out of the tail pipe (also not shown) as exhaust gas acceptable to regulatory or vehicle designer standards. The catalytic converter 14 and catalyst 15 are of any suitable type known to those skilled in the art for facilitating the species conversion and need not be set forth in further detail herein.

The system shown uses the temperature difference across the catalytic converter catalyst to predict the catalyst efficiency. A first sensor 18 is positioned upstream of the catalyst, as shown, either in the pipe 12 leading from the engine manifold to the catalytic converter 14 or in the inlet cone of the catalytic converter 14. Sensor 18 may be a thermocouple, thermistor, resistance temperature resistor (RTD) or any other suitable temperature sensor for use in the high temperature environment to which the catalytic converter 14 is exposed. The sensor 18 must be capable of sensing temperature changes in the temperature range of 400°–800° C. with good signal range. It is also preferable that the sensor 18 have a response time of 10 seconds or less so that it quickly stabilizes after transient maneuvers causing transient conditions in the exhaust system. Such sensors are known and available to those skilled in the art. Preferably, the sensor 18 is located at least three inches upstream of the catalyst 15 to minimize the effects of heat radiated from the catalyst 15 onto the sensing element of sensor 18.

A second sensor 20 is placed downstream of the catalyst 15 as shown in the figure, or alternatively, in the catalytic converter catalyst block 15 itself, or between adjacent catalyst blocks at least 2–3 inches downstream of the front surface of the catalytic converter catalyst block 15. Sensor 20, like sensor 18, may also be a thermocouple, thermistor, RTD or any other suitable temperature sensing device with the same response characteristics as sensor 18.

The placement of the temperature sensors 18 and 20 as shown in FIG. 1 allows monitoring of the temperature difference upstream and downstream of the catalytic converter 14. Typically, when the catalytic converter 14 is new, most of the exothermic reaction takes place at the front end of the catalyst 15, which generates the heat from the exothermic reaction, heating the exhaust gas flowing through the catalytic converter 14. The downstream portion of the catalyst 15 may effect some reabsorption of the heat from the exhaust gases and may act as a heat draw from the front end of the catalyst 15 so that the temperature difference between sensors 18 and 20 need not literally indicate the amount of heat released in the active portion of catalyst 15. However, the temperature difference between sensors 18 and 20 will be consistent for a given operating condition of the vehicle engine and a given catalytic converter efficiency.

As the catalytic converter ages, the location of species conversion within the converter tends to migrate toward the downstream end of catalyst 15. When the species conversion takes place at the downstream end of the converter catalyst, the heat released by the catalyst 15 has no further catalyst to be reabsorbed by and, therefore, the temperature difference between the downstream and upstream temperature sensors tends to increase as the converter ages. Generally, a consistent temperature difference between the two sensors or an increase in the temperature difference between the two sensor indicates efficient functioning of the catalytic converter.

As described below, the example apparatus according to this invention generates a base line exotherm table and stores the table in memory of the controller 28 when the catalytic converter is new and assumed to be operating properly. The apparatus takes into account the aging of the catalytic converter and continuously updates the exotherm base line table stored in the electronic controller 28 in response to the performance of the catalyst as it ages.

Lines 24 and 26 provide the information from sensors 18 and 20 to the electronic controller 28. The engine 10 is shown with arrow 22 leading to the controller 28 representing that, according to the preferred embodiment of this invention, the controller 28 monitors one or more engine operating conditions. When the controller 28 generates an exotherm base line table, the table is stored correlating to engine operating conditions and, when the controller 28 measures and analyzes the exotherm, the analysis is done corresponding to the engine operating conditions used in generating the table. Examples of engine operating conditions monitored by the control 28 are one or more of the following: engine RPM, vehicle manifold gas temperature, mass air flow into the vehicle engine, the air fuel ratio into the vehicle engine and the position of the engine throttle.

Reference 32 indicates an input to the controller 28 indicating distance traveled by the vehicle. The distance traveled signal can be provided from the conventional vehicle odometer signal, from the memory of an electronic odometer, if included on the vehicle, from a mileage signal already used by some engine control modules, or any other suitable source of data indicating the amount of use of the vehicle. The distance information provides a computation of age of the catalytic converter as it relates to miles driven by the vehicle and keeps track of the number of miles after the vehicle is new or a new catalytic converter is installed in the vehicle. The calibration tables are generated during the time period that the catalytic converter 14 is considered new.

The controller 28 includes a microprocessor 30 that performs the functions of generating the exotherm base line table, analyzing the performance of the catalytic converter and providing a signal on line 34 to telltale 36. The telltale 36 is illuminated when the controller 28 determines that the catalytic converter 14 is operating inefficiently.

In one example, the controller 28 may be the electronic control module for the vehicle engine 10 of a type known to those skilled in the art for performing a variety of engine control functions and engine diagnostic functions well known to those skilled in the art. The controller is modified to include the control commands described below and to receive input signals from the temperature sensors 18, 20. Such modifications are easily made by one skilled in the art in view of the information set forth herein.

Figure 2:
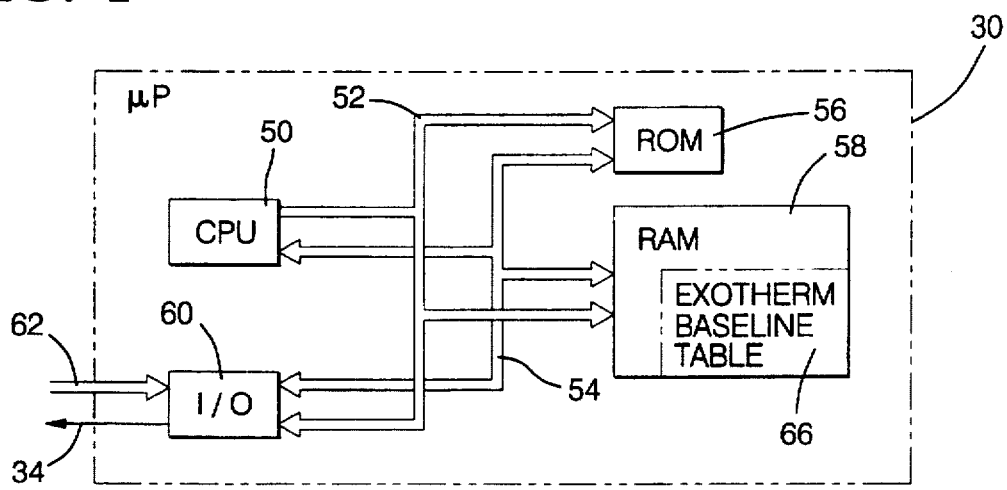
FIG. 2 illustrates a schematic of an example microprocessor for implementation with this invention.

Referring now to FIG. 2, the example microprocessor 30 shown is of a standard type that includes a central processing unit 50, ROM 56, RAM 58 and input/output circuitry 60 for receiving the various input signals represented by bus 62 and for providing the output signal represented by line 34 for controlling the telltale 36 (FIG. 1). The microprocessor includes command data bus 52 for sending commands to the various microprocessor devices including ROM 56, RAM 58 and input/output circuitry 60 and bi-directional data bus 54 for transferring data between the various units 50, 56, 58 and 60. A nonvolatile memory such as ROM 56 stores a series of commands to be executed by the central processing unit 50 for carrying out the engine control functions and for carrying out the catalytic converter monitor method according to this invention.

Figure 3:
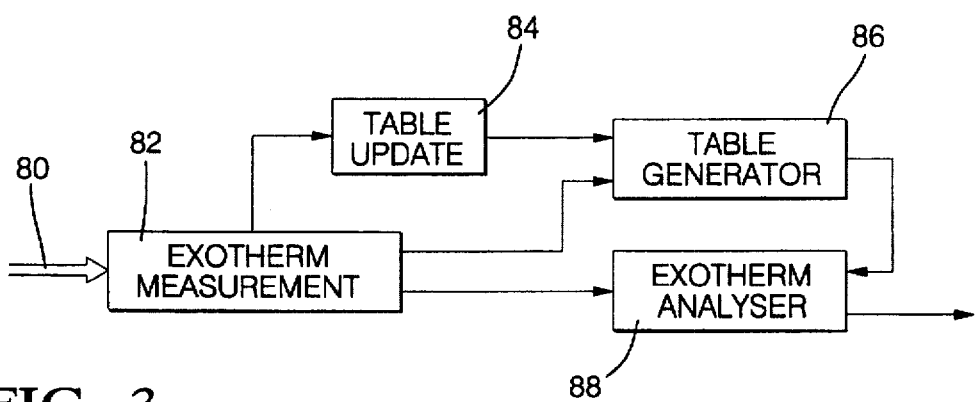
FIG. 3 illustrates schematically an example of the method according to this invention.

Referring now also to FIG. 3, the catalytic converter monitor method is shown schematically. The arrow 80 represents the input signals to the method including the signal, such as engine RPM, representative of the engine operating state and the signals from the two temperature sensors 18 and 20 (FIG. 1). Block 82 represents the determination by the controller of the exotherm across the catalytic converter. The exotherm $\Delta T$ at time $t_0$ is determined as follows:

$$\Delta T(t_0) = T_{out}(t_0) - T_{in}(t_0 - \tau_{MAF}),$$

where $\tau_{MAF}$ is a constant that takes into account the time for the downstream temperature to react to a change in the upstream temperature. $\tau_{MAF}$ may be set at a constant value or scheduled according to mass air flow into the engine. Since, as will be explained below, exotherm measurement is only taken during steady state conditions, either approach is acceptable.

When either the vehicle is new and therefore the catalytic converter is new or the catalytic converter has been replaced in the vehicle, the exotherm measurements determined at block 82 are, for a period of, for example 3,000 miles of vehicle operation while the catalytic converter is new, used by table generator 86 to generate the exotherm base line table. The table generated by table generator 86 is stored either in the keep alive RAM memory as table 66 (FIG. 2) or in another form of nonvolatile memory. After the table 66 is generated and the catalytic converter is no longer new, i.e., over 3000 vehicle miles old, the exotherm measurement block 82 continues to measure the exotherm of the catalytic converter and provides that information to the exotherm analyzer 88. Exotherm analyzer 88 compares the determined exotherm to that stored in the table corresponding to the same engine operating conditions and from the comparison determines the performance of the catalytic converter.

Also during engine operation, block 84 receives the exotherm measurements and if they meet a specific criterion, updates the table generated by the table generator 86. These updates to the table by block 84 account for replacement of the catalytic converter 14 (FIG. 1), or for changes in the catalytic converter 14 as it ages so that the table 86 adaptively updates with the changing characteristics of the catalytic converter 14.

Figure 4:
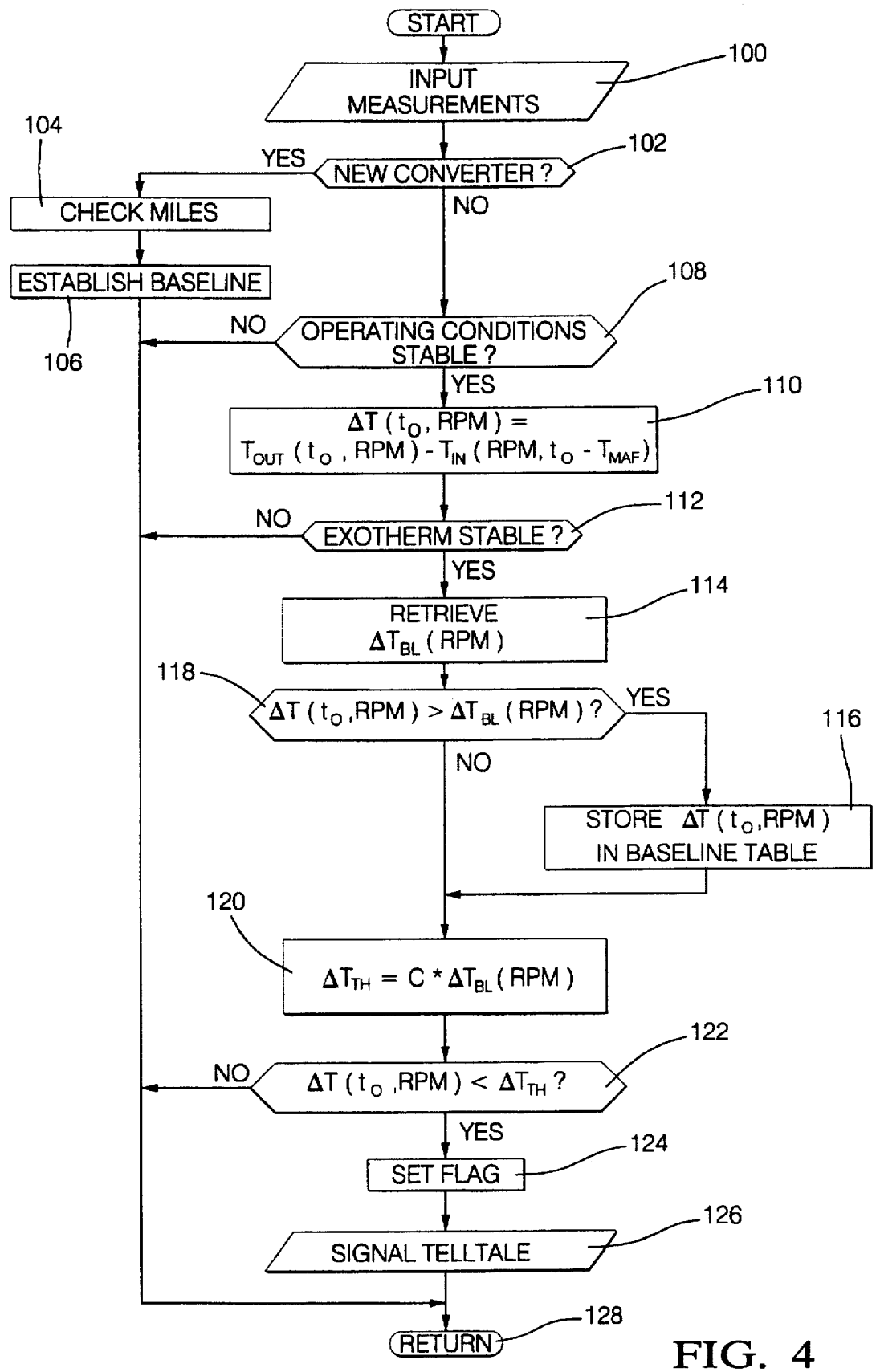
FIGS. 4 and 5 illustrate flow diagrams of an example computer routine carried out according to this invention by the electronic controller.

Referring now to FIG. 4 the flow diagram shows the steps of an example control routine performed by the microprocessor 30 within the controller 28 for carrying out the preferred example of this invention. The routine shown may be implemented as one of a variety of engine control and diagnostic routines carried out by microprocessor 30.

The routine begins and moves to block 100 where the various temperature and engine operating condition signals are input to the controller 28. At block 102, the routine determines whether or not the converter is a new converter. This decision at block 102 may be based simply on the number of miles on the vehicle if the vehicle is new or on the number of miles since the vehicle has received a new catalytic converter. To track the latter, a provision is made in the controller 28, such as an input line of a type known to those skilled in the art, accessible by a vehicle service person for setting a flag within the controller 28 when a new catalytic converter is placed in the vehicle.

If the converter is a new converter, the routine moves to block 104 where it checks the number of miles either on the new vehicle or since the catalytic converter has been replaced. If the number of miles at block 104 is over a predetermined amount, for example 3,000, either on the new vehicle or since the catalytic converter has been replaced, the new converter flag is reset so that, at the next pass through block 102, the routine will not continue to block 104 but will instead continue to block 108.

After block 104, block 106 runs a subroutine for generating the base line exotherm table using measurement information from the vehicle engine and the temperature sensors 18 and 20. The base line exotherm table defines the operating criteria for the catalytic converter 14 based on its performance in the system when new.

Figure 5:
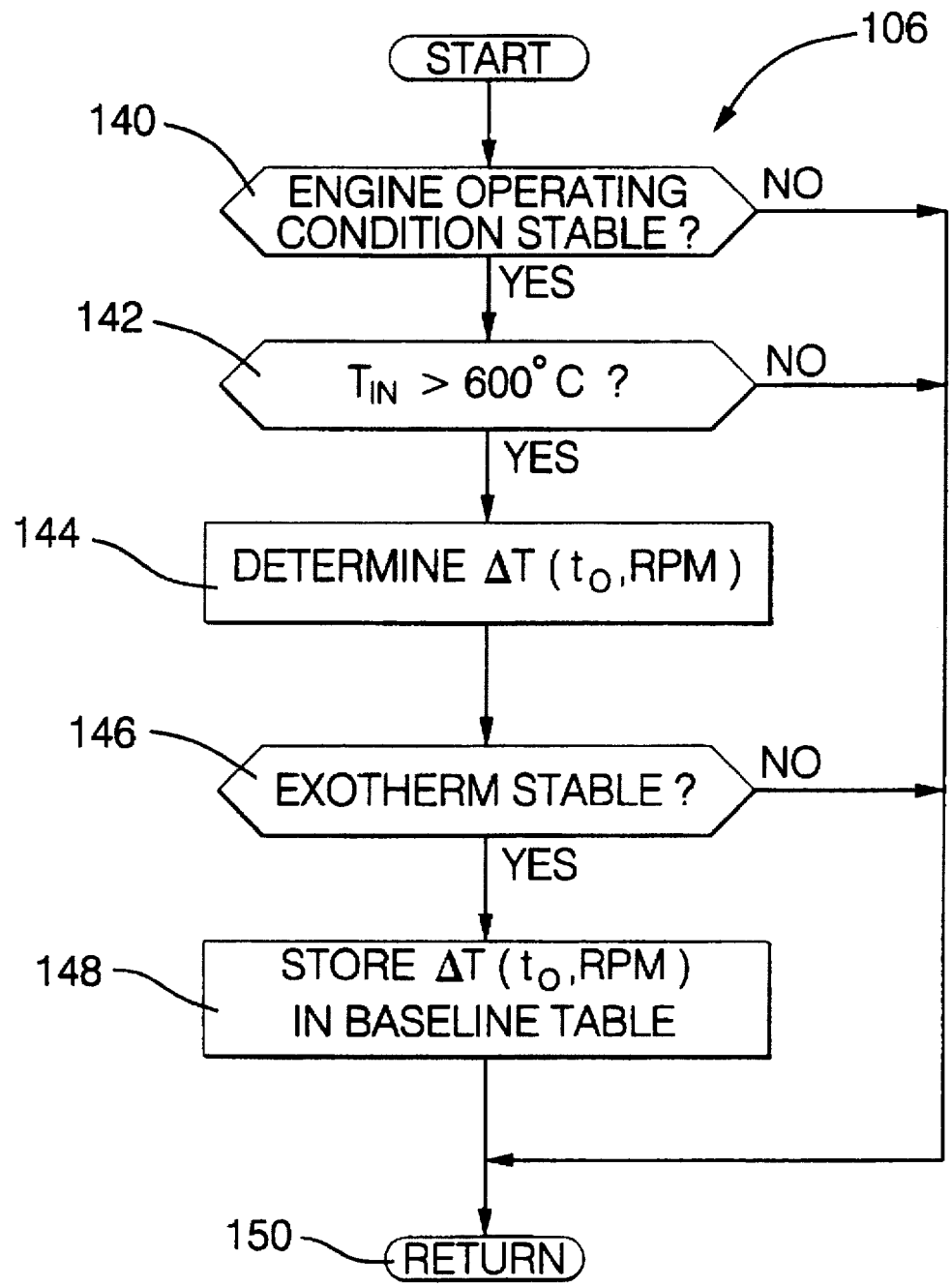

Referring now to FIG. 5, the subroutine 106 for establishing the exotherm base line is shown. At block 140, the subroutine determines whether the engine operating conditions are stable. Assuming that the engine operating condition used is engine RPM, an example of the test at block 140 determines whether or not the engine speed has been constant within a predetermined range for a predetermined time period, for example, 10 seconds. If the engine speed has been within a predetermined range for the predetermined time period, the test is passed at block 140. If not, the test is failed at block 140 and the subroutine jumps to block 150 where the subroutine 106 is exited.

If the test at block 140 is passed, the routine moves to block 142 where it checks the temperature reading, $T_{in}$, from the temperature sensor upstream of the catalytic converter and compares that temperature reading to a predetermined threshold, for example 600° C. If the temperature is not above 600° C., then it indicates that the vehicle engine and catalytic converter are still warming up and that the catalytic converter has not yet reached light-off temperature. When the catalytic converter has not yet reached light-off temperature, it is not appropriate to assess its operating conditions.

If at block 142 the temperature $T_{in}$ from the upstream temperature sensor is above 600° C., the routine moves to block 144 where it determines the exotherm, $\Delta T(t_0, RPM)$ using the upstream and downstream temperature measurements as output by sensors 18 and 20. $\Delta T(t_0, RPM)$ is determined as described above with reference to FIG. 3. From block 144 the routine moves to block 146 where it determines if the exotherm is stable. The test at block 146 compares $\Delta T(t_0, RPM)$ to the $\Delta T$'s determined over the previous, for example, ten seconds, and determines whether the $\Delta T$'s during the comparison period are all within a predetermined range of $\Delta T(t_0, RPM)$. If the $\Delta T$'s during that period are not within the predetermined range, for example, +/-3° C., of $\Delta T(t_0, RPM)$, then the exotherm is not considered stable and the subroutine is exited at block 150. If the $\Delta T$ is stable, that is, if the $\Delta T$'s over the time period are all within the predetermined range of $\Delta T(t_0, RPM)$, then the routine moves to block 148 where $\Delta T(t_0, RPM)$ is stored in the exotherm base line table, scheduled based on the engine operating condition. In this example, the engine operating condition used is engine RPM so $\Delta T$ is stored in the base line table schedule based on engine RPM. From block 148 the routine exits at block 150.

Referring again to FIG. 4, after the base line generation subroutine 106 is completed, the routine is exited at block 128.

Referring again to block 102, if the test at block 102 determines that the catalytic converter is not a new catalytic converter, the routine continues to block 108 where it determines whether the engine operating conditions are stable. This is the same test determined at block 140 in FIG. 5, described above. If the test is failed, the routine exits at block 128.

If the test at block 108 is passed, that is, if the engine operating conditions are stable, the routine moves to block 110 where it determines $\Delta T(t_0, RPM)$ in the same manner described above with reference to FIG. 3. From block 110 the routine moves to block 112 where it determines if the exotherm is stable. This is the same test performed at block 146 in FIG. 5. If the exotherm is not stable, the routine is exited at block 128. If the exotherm is stable, the routine moves to block 114 where it retrieves, from the exotherm base line table, the base line exotherm, $\Delta T_B(RPM)$, where, in this example, engine RPM is the corresponding engine operating condition. From block 114, the routine moves to block 118 where it compares the presently measured exotherm $\Delta T(t_0, RPM)$ to the base line exotherm. If the presently measured exotherm is greater than the base line exotherm, the table is to be updated. This condition will occur as the catalytic converter ages and the active portion of the converter moves from the front toward the rear, in which cased, the exotherm measured from the properly functioning converter will increase for a given operating condition. Thus, if $\Delta T(t_0, RPM)$ is greater than $\Delta T_B(RPM)$, the routine moves to block 116 where it stores the present exotherm, $\Delta T(t_0, RPM)$, in the base line table, replacing the previously stored value, $\Delta T_B(RPM)$ in the base line table at the given operating condition.

The routine then continues to block 120 either from block 116 or block 118 where it determines the threshold value $\Delta T_{TH}$ as follows:

$$\Delta T_{TH} = C \times \Delta T_B(RPM),$$

where c is a constant, for example, 0.6. This sets a threshold $\Delta T_{TH}$ that is used at block 122 to determine whether or not the catalytic converter efficiency has dropped to the point where it is desirable to service the catalytic converter. At block 122, the subroutine compares the presently measured exotherm, $\Delta T(t_0, RPM)$, to $\Delta T_{TH}$. If $\Delta T(t_0, RPM)$ is less than $\Delta T_{TH}$, then the catalytic converter efficiency has dropped passed the desired limit and the routine moves to block 124 where it sets a flag in the controller indicating that the catalytic converter may need replacement. From block 124 the routine moves to block 126 where it outputs a signal to a telltale to inform a vehicle operator that service may be desired in the catalytic converter.

If at block 122 the measured exotherm $\Delta T(t_0, RPM)$ is not less than $\Delta T_{TH}$, then the routine continues to block 128 where it is exited.

In the above example, a catalytic converter diagnosis is set forth that establishes a criteria based on the functioning of a new catalytic converter over a period of time after a new catalytic converter is installed in the vehicle. The criteria comprises the generated exotherm base line table and is used in diagnosing the operability of the catalytic converter as it ages. This technique allows use of sensors that need not be calibrated to be highly accurate in measuring temperature as long as they are repeatable in their performance.

The example also provides adaptive updating of the exotherm base line table as the catalytic converter ages, taking into account the migration of the active portion of the catalyst from the upstream portion to the downstream portion as the catalyst ages.

In the above examples, the exotherm base line table is scheduled based on one engine operating condition, engine RPM. In other examples, the exotherm base line table may be scheduled based on a different operating condition or based on two or more engine operating conditions, for example: engine RPM and intake manifold air temperature; or engine RPM and throttle angle; etc.

I claim:

1. A catalytic converter monitor method comprising the steps of:

periodically measuring exothermic reaction of a catalytic converter receiving exhaust gas from an internal combustion engine;

during a time period in which the catalytic converter is new, generating an exotherm base line table responsive to the measured exothermic reaction;

after the time period in which the catalytic converter is new, comparing the measured exothermic reaction to the exotherm base line table; and indicating an operating condition of the catalytic converter responsive to the comparison.

2. A catalytic converter monitor method according to claim 1, also comprising the step of:

updating the exotherm base line table if the measured exothermic reaction is greater than a corresponding stored exothermic value in the exotherm base line table, wherein the stored exothermic value in the exotherm base line table is replaced by a value representing the measured exothermic reaction.

3. A catalytic converter monitor apparatus is provided comprising:

a first temperature sensor mounted in a vehicle exhaust system upstream of a catalytic converter catalyst;

a second temperature sensor mounted in the vehicle exhaust system downstream of at least a portion of the catalytic converter catalyst;

an electronic controller coupled to the first and second temperature sensors and to the vehicle engine, wherein the vehicle engine provides an input signal indicative of an engine operating condition to the electronic controller, wherein the electronic controller comprises an exotherm monitor for determining a quantity of exothermic reaction taking place in the catalytic converter, a table generator responsive to the exotherm monitor for generating a table of exotherm outputs correlating to the engine operating condition, and an exotherm analyzer responsive to the exotherm monitor and the table for comparing a present quantity of exothermic reaction to an output stored in the table for the corresponding engine operating condition and for outputting a control signal if the comparison indicates inefficient operation of the catalytic converter.

4. A catalytic converter monitor apparatus according to claim 3, wherein the engine operating condition is engine speed.

5. A catalytic converter monitor apparatus according to claim 3, wherein the electronic controller also comprises: an adaptive table modifier, for updating the table as the catalytic converter ages.

6. A catalytic converter monitor apparatus according to claim 5, wherein the adaptive table modifier only updates the table if the present quantity of exothermic reaction is greater than the corresponding output stored in the table.

7. A catalytic converter monitor apparatus comprising:

a first temperature sensor mounted in a vehicle exhaust system upstream of a catalytic converter catalyst;

a second temperature sensor mounted in the vehicle exhaust system downstream of at least a portion of the catalytic converter catalyst;

an exotherm monitor coupled to the first and second temperature sensors, providing an output signal indicative of a quantity of exothermic reaction taking place in the catalytic converter;

a table generator coupled to the exotherm monitor, receiving the output signal from the exotherm monitor and generating a table of exotherm criteria responsive to the output signal; and an exotherm analyzer coupled to the exotherm monitor and the table generator, providing an output responsive to a comparison between a present value of the output signal and a corresponding criteria stored in the table.

8. A catalytic converter monitor apparatus according to claim 7, additionally comprising:

an adaptive table modifier for updating the table as the catalytic converter ages.

9. A catalytic converter monitor apparatus according to claim 8, wherein the adaptive table modifier only updates the table if the present value of the output signal is greater than the corresponding criteria stored in the table.

* * * * *